United States Patent
Parker

(10) Patent No.: US 7,889,750 B1
(45) Date of Patent: Feb. 15, 2011

(54) METHOD OF EXTENDING DEFAULT FIXED NUMBER OF PROCESSING CYCLES IN PIPELINED PACKET PROCESSOR ARCHITECTURE

(75) Inventor: David K. Parker, Cheltenham (GB)

(73) Assignee: Extreme Networks, Inc., Santa Clara, CA (US)

( * ) Notice: Subject to any disclaimer, the term of this patent is extended or adjusted under 35 U.S.C. 154(b) by 681 days.

(21) Appl. No.: 11/324,205

(22) Filed: Dec. 30, 2005

Related U.S. Application Data

(63) Continuation-in-part of application No. 10/835,598, filed on Apr. 28, 2004, now Pat. No. 7,649,879.

(51) Int. Cl.
*H04L 12/28* (2006.01)
*H04L 12/56* (2006.01)
*G06F 7/38* (2006.01)
*G06F 9/00* (2006.01)
*G06F 9/44* (2006.01)

(52) U.S. Cl. .................. 370/412; 370/389; 712/244
(58) Field of Classification Search .............. 370/229, 370/230, 395.31, 389, 396, 440, 402; 712/241, 712/244, 205, 234, 213, 225
See application file for complete search history.

(56) References Cited

U.S. PATENT DOCUMENTS

| | | | |
|---|---|---|---|
| 4,480,307 A | 10/1984 | Budde et al. | |
| 5,072,443 A * | 12/1991 | Hahne et al. | 370/440 |
| 5,282,270 A | 1/1994 | Oppenheimer et al. | |
| 5,524,258 A | 6/1996 | Corby et al. | |
| 5,764,636 A | 6/1998 | Edsall | |
| 5,784,569 A | 7/1998 | Miller et al. | |
| 5,852,607 A | 12/1998 | Chin | |

(Continued)

FOREIGN PATENT DOCUMENTS

WO    WO 03/081857    10/2003

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Jayanti K Patel
*Assistant Examiner*—Christopher T Wyllie
(74) *Attorney, Agent, or Firm*—Blakely, Sokoloff, Taylor & Zafman

(57) ABSTRACT

In a packet processing system, where a packet processor normally performs a fixed number of processing cycles on a packet as it progresses through a processing pipeline, a method of extending the fixed number of processing cycles for a particular packet is provided. During the processing of a packet, an extension bit associated with the packet is set to an "on" state if extended processing of the packet is needed. While the extension bit is set to that state, updating of a count, indicating the number of processing cycles that has been undertaken for the packet, is inhibited. When the extended processing of the packet has been completed, the extension bit for the packet is set to an "off" state, and the updating of the count resumed. When that count indicates the number of processing cycles the packet has undergone equals or exceeds the fixed number, the packet is exited from the pipeline.

17 Claims, 4 Drawing Sheets

U.S. PATENT DOCUMENTS

| | | | |
|---|---|---|---|
| 5,923,660 A | | 7/1999 | Shemla et al. |
| 5,999,518 A * | | 12/1999 | Nattkemper et al. ........ 370/258 |
| 6,034,957 A | | 3/2000 | Haddock et al. |
| 6,115,793 A * | | 9/2000 | Gruber et al. ............... 711/133 |
| 6,128,687 A * | | 10/2000 | Dao et al. .................... 710/305 |
| 6,170,051 B1 * | | 1/2001 | Dowling ..................... 712/225 |
| 6,172,980 B1 | | 1/2001 | Flanders et al. |
| 6,173,333 B1 | | 1/2001 | Jolitz et al. |
| 6,208,649 B1 | | 3/2001 | Kloth |
| 6,275,861 B1 | | 8/2001 | Chaudri et al. |
| 6,295,299 B1 | | 9/2001 | Haddock et al. |
| 6,351,801 B1 * | | 2/2002 | Christie et al. .............. 712/205 |
| 6,381,242 B1 | | 4/2002 | Maher, III et al. |
| 6,384,750 B1 | | 5/2002 | Brown |
| 6,463,067 B1 * | | 10/2002 | Hebb et al. .................. 370/413 |
| 6,515,963 B1 | | 2/2003 | Bechtolsheim et al. |
| 6,553,002 B1 | | 4/2003 | Bremer et al. |
| 6,570,877 B1 | | 5/2003 | Kloth et al. |
| 6,631,465 B1 * | | 10/2003 | Chen et al. .................. 712/234 |
| 6,658,002 B1 | | 12/2003 | Ross et al. |
| 6,731,652 B2 | | 5/2004 | Ramfelt et al. |
| 6,738,892 B1 | | 5/2004 | Coon et al. |
| 6,754,742 B1 * | | 6/2004 | Alowersson et al. .......... 710/53 |
| 6,763,023 B1 | | 7/2004 | Gleeson et al. |
| 6,765,881 B1 | | 7/2004 | Rajakarunanayake |
| 6,813,275 B1 * | | 11/2004 | Sharma et al. ............... 370/412 |
| 6,871,262 B1 | | 3/2005 | Oren et al. |
| 6,882,642 B1 | | 4/2005 | Kejriwal et al. |
| 6,888,797 B1 | | 5/2005 | Cao et al. |
| 6,901,072 B1 * | | 5/2005 | Wong ......................... 370/389 |
| 6,914,905 B1 | | 7/2005 | Yip |
| 6,917,617 B2 | | 7/2005 | Jin et al. |
| 6,957,258 B2 | | 10/2005 | Maher, III et al. |
| 6,975,581 B1 | | 12/2005 | Medina et al. |
| 6,976,158 B2 * | | 12/2005 | Catherwood et al. ........ 712/241 |
| 6,980,552 B1 * | | 12/2005 | Belz et al. ................... 370/392 |
| 6,999,462 B1 | | 2/2006 | Acharya |
| 7,062,398 B1 * | | 6/2006 | Rothberg .................... 702/115 |
| 7,062,641 B1 * | | 6/2006 | Devanagondi et al. ...... 712/244 |
| 7,079,407 B1 | | 7/2006 | Dimitrelis |
| 7,111,101 B1 | | 9/2006 | Cox |
| 7,139,271 B1 | | 11/2006 | Parruck et al. |
| 7,152,191 B2 | | 12/2006 | Kessler et al. |
| 7,158,900 B2 * | | 1/2007 | McNutt ......................... 702/73 |
| 7,190,696 B1 | | 3/2007 | Manur et al. |
| 7,212,837 B1 | | 5/2007 | Calhoun et al. |
| 7,248,584 B2 | | 7/2007 | Hooper |
| 7,248,585 B2 | | 7/2007 | Kohn et al. |
| 7,274,693 B1 | | 9/2007 | Kloth et al. |
| 7,296,100 B1 * | | 11/2007 | Venkatesh et al. ............. 710/33 |
| 7,304,996 B1 * | | 12/2007 | Swenson et al. ............ 370/394 |
| 7,444,405 B2 | | 10/2008 | Gangadharan |
| 7,483,377 B2 * | | 1/2009 | Szumilas .................... 370/235 |
| 7,487,938 B2 | | 2/2009 | Brady et al. |
| 7,502,374 B1 * | | 3/2009 | Parker et al. ........... 370/395.32 |
| 7,515,589 B2 | | 4/2009 | Bacher et al. |
| 7,580,350 B1 * | | 8/2009 | Parker ........................ 370/230 |
| 7,649,879 B2 * | | 1/2010 | Parker ........................ 370/389 |
| 7,760,747 B2 * | | 7/2010 | Dally et al. .................. 370/412 |
| 2001/0025315 A1 | | 9/2001 | Jolitz |
| 2002/0037729 A1 | | 3/2002 | Kitazawa et al. |
| 2002/0051460 A1 * | | 5/2002 | Galbi et al. .................. 370/412 |
| 2002/0054594 A1 * | | 5/2002 | Hoof et al. ................... 370/389 |
| 2002/0061012 A1 | | 5/2002 | Thi et al. |
| 2002/0071433 A1 * | | 6/2002 | Tsuruoka et al. ............ 370/389 |
| 2002/0138717 A1 * | | 9/2002 | Joy et al. ..................... 712/235 |
| 2002/0191605 A1 | | 12/2002 | Lunteren et al. |
| 2003/0037226 A1 * | | 2/2003 | Tsuruta et al. ............... 712/228 |
| 2003/0043848 A1 * | | 3/2003 | Sonksen ...................... 370/474 |
| 2003/0069973 A1 | | 4/2003 | Ganesan et al. |
| 2003/0154380 A1 | | 8/2003 | Richmond et al. |
| 2003/0163589 A1 * | | 8/2003 | Bunce et al. ................. 709/250 |
| 2003/0193949 A1 | | 10/2003 | Kojima et al. |
| 2004/0003110 A1 | | 1/2004 | Ozguner |
| 2004/0015683 A1 * | | 1/2004 | Emma et al. ................. 712/240 |
| 2004/0017807 A1 * | | 1/2004 | Dorr et al. ................... 370/389 |
| 2004/0062253 A1 * | | 4/2004 | Kurupati ...................... 370/401 |
| 2004/0100956 A1 | | 5/2004 | Watanabe |
| 2004/0120435 A1 | | 6/2004 | Yang et al. |
| 2004/0205753 A1 | | 10/2004 | Moore |
| 2004/0246981 A1 | | 12/2004 | He et al. |
| 2004/0258062 A1 | | 12/2004 | Narvaez |
| 2005/0033941 A1 * | | 2/2005 | Joyce et al. .................. 712/213 |
| 2005/0074009 A1 | | 4/2005 | Kanetake |
| 2005/0198362 A1 | | 9/2005 | Navada et al. |
| 2005/0226242 A1 | | 10/2005 | Parker |
| 2006/0007917 A1 | | 1/2006 | Saito et al. |
| 2006/0039374 A1 * | | 2/2006 | Belz et al. ................... 370/389 |
| 2008/0222094 A1 | | 9/2008 | Cox |

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via incremental update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000g1q.html.

Zhang, Z., *Recovery of Memory and Process in DSM Systems: HA Issue #1*, Hewlett-Packard Co. HPL-2001-76, Mar. 30, 2001.

International Search Report for PCT/US05/10435, mailed Aug. 25, 2008.

Office Action for U.S. Appl. No. 10/835,598, dated Mar. 24, 2009.

Response to Office Action for U.S. Appl. No. 10/835,598, dated Aug. 24, 2009.

Non-Final Office Action for U.S. Appl. No. 10/835,598 Mailed Jun. 20, 2008, 22 Pages.

Notice of Allowance and Fees for U.S. Appl. No. 10/835,598 Mailed Nov. 5, 2009, 8 Pages.

International Preliminary Report on Patentability for PCT Application PCT/US2005/010435 Mailed Oct. 2, 2008, 7 Pages.

\* cited by examiner

METHOD OF EXTENDING DEFAULT FIXED NUMBER OF PROCESSING CYCLES IN PIPELINED PACKET PROCESSOR ARCHITECTURE

This application is a continuation-in-part of U.S. patent application Ser. No. 10/835,598, entitled "PIPELINED PACKET PROCESSOR," filed Apr. 28, 2004, now U.S. Pat. No. 7,649,879 which is hereby incorporated by reference herein as though set forth in full. Additionally, this application is related to U.S. patent application Ser. No. 11/324,159, entitled "METHOD OF PROVIDING VIRTUAL ROUTER FUNCTIONALITY," filed concurrently herewith; U.S. patent application Ser. No. 11/324,209, entitled "MAC ADDRESS DETECTION DEVICE FOR VIRTUAL ROUTERS," filed concurrently herewith; U.S. patent application Ser. No. 11/232,998, entitled "METHOD OF PROVIDING VIRTUAL ROUTER FUNCTIONALITY THROUGH ABSTRACTED VIRTUAL IDENTIFIERS," filed concurrently herewith, each of which is hereby incorporated by reference herein as though set forth in full.

BACKGROUND OF THE INVENTION

1. Field of the Invention

This application relates generally to pipelined packet processors, and, more specifically, to packet processors that normally process each packet by performing a fixed number of processing cycles on the packet as it passes through the processing pipeline.

2. Related Art

In conventional packet processing systems employing a pipelined packet processing architecture, a packet processor performs a fixed number of processing cycles on each of the packets as they pass through the pipeline. If a packet requires less than the fixed number of processing cycles, the remaining cycles are consumed with "no operation" (NOP) cycles. Packet processing is simplified as each of the packets is processed through the pipeline in order, and there is little or no chance that the packets will get out of order.

A problem with the conventional approach is there is no satisfactory way of handling the situation where a packet requires more than the fixed number of processing cycles. Either the extra processing cycles are avoided so that system can output packets at line rate—in which case processing of the packet is not completed, resulting in a non-optimal or incorrect processing decision for the packet—or else the fixed number of processing cycles applied to each packet is increased to the maximum number of cycles any of the packets will require—resulting in many more of the packets being burdened with extra cycles that are wasted and filled with NOP operations.

SUMMARY

The invention provides a method of extending for a particular packet a default, fixed number of processing cycles that is normally applied to each packet in a pipelined packet processing system as the packets progress through the processing pipeline. The method involves maintaining, in state data associated with the packet, a count of the number of processing cycles the packet has undergone or that remain, and an extension bit indicating whether or not the fixed number of processing cycles should be extended for the packet. The extension bit is set to a default, first state.

Prior to completing the fixed number of processing cycles for the packet, the extension bit is set to a second state if additional processing cycles are needed for the packet. While the extension bit is set to the second state, the updating of the count is inhibited. Upon completion of the additional processing cycles needed for the packet, the extension bit is set to the first state. Upon completing a processing cycle for the packet, the count is updated, either through incrementing or decrementing, but only if the extension bit for the packet is set to the first state. While the count indicates the number of processing cycles the packet has undergone is less than the fixed number, the method continues to perform processing cycles on the packet. The packet is exited from the pipeline once the count indicates the number of processing cycles the packet has undergone equals or exceeds the fixed number.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
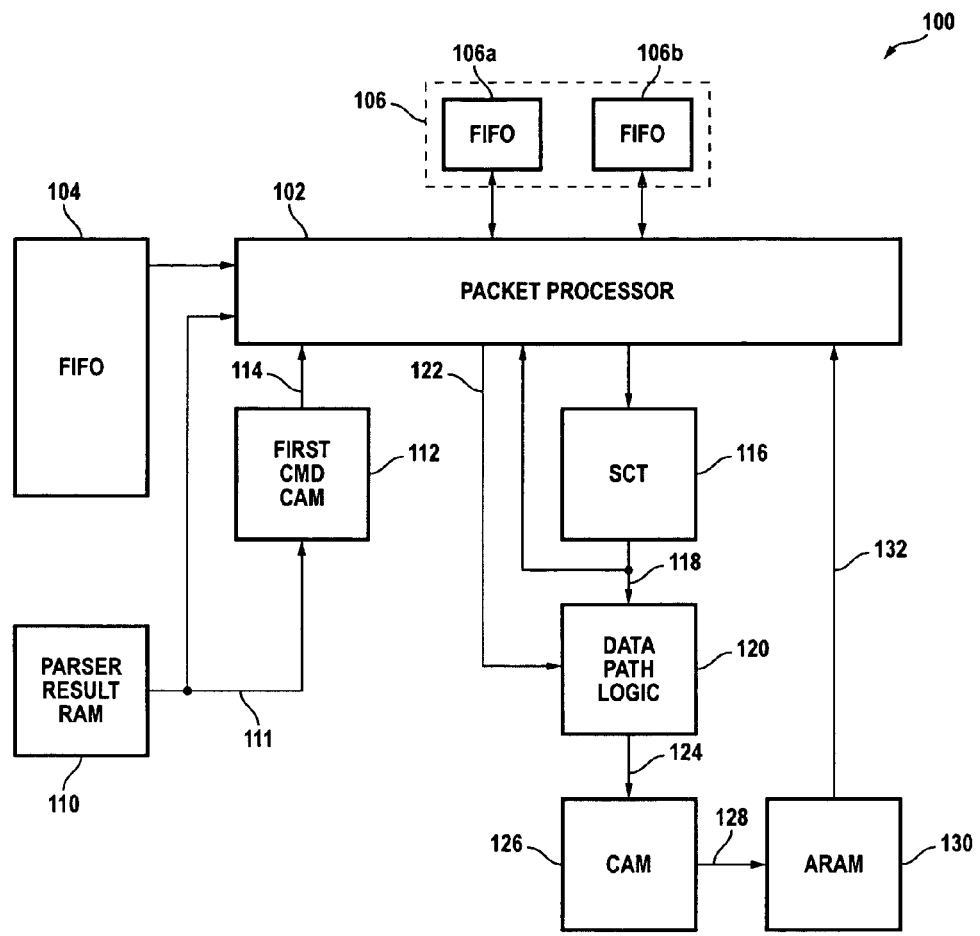
FIG. 1 is a block diagram of an embodiment of a pipeline packet processing architecture, characterized by a packet processor that normally performs a default, fixed number of processing cycles for a packet, but which performs extended processing cycles depending on whether a particular packet state bit is turned "on" or not.

FIG. 1 illustrates an embodiment 100 of a packet processing system, where a packet processor 102 implementing a processing pipeline normally performs a fixed number of processing cycles on each packet as it passes through the pipeline. In this embodiment, the system is part of the network side portion of a networking device, and performs processing on ingress packets arriving over the network. The system may be implemented in ASICs technology, on one or more integrated circuit chips. The system may be included in any networking device, including but not necessarily limited to any device that is capable of forwarding or classifying packets at OSI layer three or above. For purposes of this disclosure, the singular terms "device" or "router" include plural devices or routers, respectively. Additionally, for purposes of this disclosure, the term "processor" refers to any device capable of executing one or more commands, instructions or state transitions, and includes, without limitation, a general- or special-purpose microprocessor, finite state machine, controller, computer, digital signal processor (DSP), or the like.

The pipeline itself is a conceptual entity that is physically realized in the system of FIG. 1 through FIFOs 104 and 106. FIFO 104 is used to buffer incoming packets that are both awaiting and undergoing processing. FIFO 106 comprises two distinct FIFOs, FIFO 106a and FIFO 106b. FIFO 106a maintains pointers to those packets stored in FIFO 104 that are awaiting processing, while FIFO 106b maintains pointers to those packets in FIFO 104 that are undergoing processing, i.e., that are in the pipeline.

The pipeline has a fixed number of slots for the placement of packets, for example, 20 slots. Accordingly, FIFO 106b has the same fixed number of slots for the placement of packet pointers. A packet enters the pipeline when its pointer is placed on the FIFO 106b, and exits the pipeline when its pointer is taken off the FIFO 106b. In a first phase of operation, the packet processor 102 is configured to assign packets to available ones of the slots, such as by loading each of the empty slots in FIFO 106b with pointers to packets in FIFO 104 that are awaiting processing. In a second phase of operation, the processor 102 then progresses through the slots in FIFO 106b in a round robin fashion. For each packet encountered, the processor 102 performs a processing cycle. In a third phase of operation, the processor 102 removes packets from the pipeline for which processing has been completed.

The processor 102 is configured to normally perform a fixed number of processing cycles on each packet in the pipeline. To keep track of the number of processing cycles that have been performed on a packet, and for other purposes, processor 102 maintains state data each packet in the pipeline, which includes a count of the number of processing cycles that have been performed so far on the packet. In FIG. 1, the state data for a packet is maintained in the entry for the packet in FIFO 106b alongside the pointer to the packet itself in FIFO 104.

Figure 2:
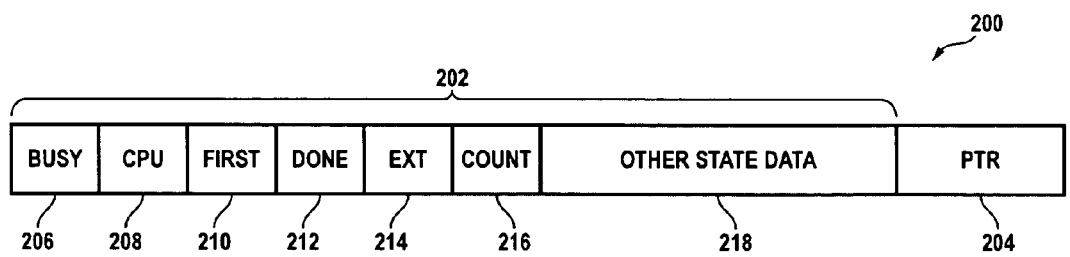
FIG. 2 is a diagram illustrating the format of state data associated with a packet in the embodiment of FIG. 1, wherein the state data includes a bit for indicating whether the packet is deserving of extended processing and a count field for keeping track of the number of processing cycles that have been performed on the packet.

FIG. 2 illustrates the format of an entry 200 in FIFO 106b. The state data for the packet is identified with numeral 202. The pointer to the packet in FIFO 104 is identified with numeral 204. In the state data 202, the BUSY bit 206 indicates whether or not the pipeline slot has been allocated for packet processing. The CPU bit 208 indicates whether or not the pipeline slot has been allocated for use by a CPU host (not shown in FIG. 1). Generally speaking, BUSY bit 206 enables selected ones of the pipeline stages to be allocated to CPU accesses for diagnostic and statistics gathering purposes. The FIRST bit 210 indicates whether or not the processing cycle is the first processing cycle for the packet. The DONE bit 212 indicates whether or not processing of the packet is finished. The EXT bit 214 indicates whether extended processing cycles are required for the packet, i.e., beyond the default, fixed number of processing cycles normally performed for each packet. The COUNT field 216 is a count of the number of processing cycles undertaken so far for the packet. Numeral 218 identifies other state data that may be maintained for the packet.

Each of the bits 206-214 is in a normally is an "off" state and set to an "on" state if the associated condition is present. For example, bit 206, normally "off," is set to "on" if the slot is allocated to packet processing. Similarly, bit 212, normally "off," is set to "on" if processing of the packet is finished (independently of whether the fixed number of processing cycles have been performed). And bit 214, normally "off," is set to "on" if extended processing of the packet is needed or desired, i.e., processing beyond the fixed number of processing cycles normally performed for each packet. In one embodiment, the "on" state for each of these bits is a logical "1," while the "off" state is a logical "0." However, it should be appreciated that an embodiment is possible in which the "on" state for each of these bits is a logical "0," and the "off" state a logical "1."

In one embodiment, the COUNT field 216 is initialized to zero, and is incremented at the conclusion of each processing cycle for which the EXT bit 214 is off. As such, absent a situation involving extended processing, the COUNT field 216 is a count of the number of processing cycles that have been performed on the packet so far. However, it should be appreciated that an embodiment is possible in which the COUNT field 216 is initialized to the default, fixed number of processing cycles normally performed for each packet, and decremented at the conclusion of each processing cycle for which the EXT bit 214 is "off." As such, absent a situation involving extended processing, the COUNT field 216 is a count of the number of processing cycles that remain To perform a processing cycle on a packet, processor 102 performs slightly different actions depending on whether the cycle is the first cycle for the packet or a subsequent cycle. If the cycle is the first cycle, which the processor 102 is able to discern based on the FIRST bit 210 in the state data for the packet, a CAM key is generated responsive to the results of parsing the packet stored in RAM 110. These results, comprising context pointers to the various layers of the packet, and previously produced by a packet parser (not shown), are stored in the RAM 110. The CAM key is used to conduct a search for a matching entry in CAM 112. Assuming there is a match, the index portion of the matching entry forms the address of the entry in Sequence Control Table (SCT) 116 that controls the processing cycle. If the cycle is a cycle subsequent to the first, the address of the SCT entry that controls the processing cycle is taken from the state data for the packet.

The addressed entry from SCT 116, identified with numeral 118, is retrieved and input to data path logic 120. Processor 102 retrieves the state data from FIFO 106b for the packet undergoing processing and configures the data path logic 120 responsive thereto, through one or more control lines 122. Data path logic 120, configured in accordance with the state data for the packet, forms a CAM key, identified with numeral 124, from the SCT entry 116 that is used to conduct a search in CAM 126. If there is a CAM hit, i.e., a matching entry in the CAM 126, the index portion of the matching entry, identified with numeral 128, forms an address to Associated RAM (ARAM) 130. An access is made to ARAM 130 using this address 128 and the addressed entry, identified with numeral 132, is retrieved. If there is a CAM miss, i.e., no matching entry in the CAM 126, then no access to the ARAM 130 is performed.

Processor 102 then updates the state data for the packet responsive to one or more of the parser results 111 as stored in RAM 110 (first cycle only), the retrieved SCT entry 118, and, if available, the retrieved ARAM entry 132, and stores the updated state data back in the entry for the packet in FIFO 106b. During the first processing cycle, the processor 102 also stores the context pointers 111 for the packet as part of the state data for the packet.

If the processor 102 discerns, from either the SCT entry 116 or ARAM entry 132, that processing of the packet is finished (independent of whether the fixed number of processing cycles has been performed), it turns DONE bit 212 "on" and EXT bit 214 "off." On the other hand, if processor 102 discerns, from either of these sources, that extended processing of the packet is required, for example, to perform deeper packet inspection, such as required to handle certain tunnel end-point scenarios, and/or perform higher-level processing of the packet, such as security filtering, it will turn EXT bit 214 "on."

In the first cycle, processor 102 also forms an initial, working classification and forwarding decision for the packet responsive to one or more of these sources, and stores the result as part of the state date for the packet. In subsequent cycles, processor 102 updates and refines that classification and forwarding decision.

At the conclusion of the processing cycle, if the EXT bit 214 is "off," processor 102 updates the COUNT field 216 in the state data, either by incrementing that field (in the case where the count represents the number of cycles that have been performed so far for the packet) or decrementing that field (in the case where the count represents the number of processing cycles that remain for the packet in question). If the EXT bit 214 is "on," processor 102 is inhibited from updating the COUNT field 216.

If the COUNT field 216 equals or exceeds the default fixed number of processing cycles (in the case where this value is incremented and represents the number of processing cycles that have been performed so far) or is equal to zero (in the case where this value is decremented and represents the number of processing cycles that remain), the packet is exited from the pipeline. In FIG. 1, this is achieved by removing the packet from the FIFO 104, and the entry for the packet from FIFO 106b, pre-pending to the packet the classification and forwarding decision for the packet, stored with the state data for the packet, and then transmitting the packet, with the classification and forwarding decision pre-pended, to the next processing stage.

If the COUNT field 216 is less than the default fixed number of processing cycles (in the case where this value is incremented and represents the number of processing cycles that have been performed so far) or is greater than zero (in the case where this value is decremented and represents the number of processing cycles that remain), the packet remains in the pipeline for additional processing cycles.

Processor 102 also updates the state data with the address of the SCT entry for the next cycle of processing of the packet. To determine this value, the processor 102 consults the SCT entry 118 for the current cycle, which typically includes an address of the next SCT entry assuming a CAM hit occurred in relation to CAM 126, and an address of the next SCT entry assuming a CAM miss occurred in relation to CAM 126. In addition, the processor 102 consults the current ARAM entry 130, present if a CAM hit occurred, which may or may not specify an address of the next SCT entry.

If both entries specify an address of the next SCT entry, a priority resolution policy to applied to select that address. In one embodiment, priority is given to any specification of the next SCT entry address in the current ARAM entry, assuming such an entry is available due to a CAM hit. If such a specification is unavailable, the next SCT entry address is taken from the current SCT entry, with one of the two possible addresses selected depending on whether or not there was a CAM hit.

Figure 3:
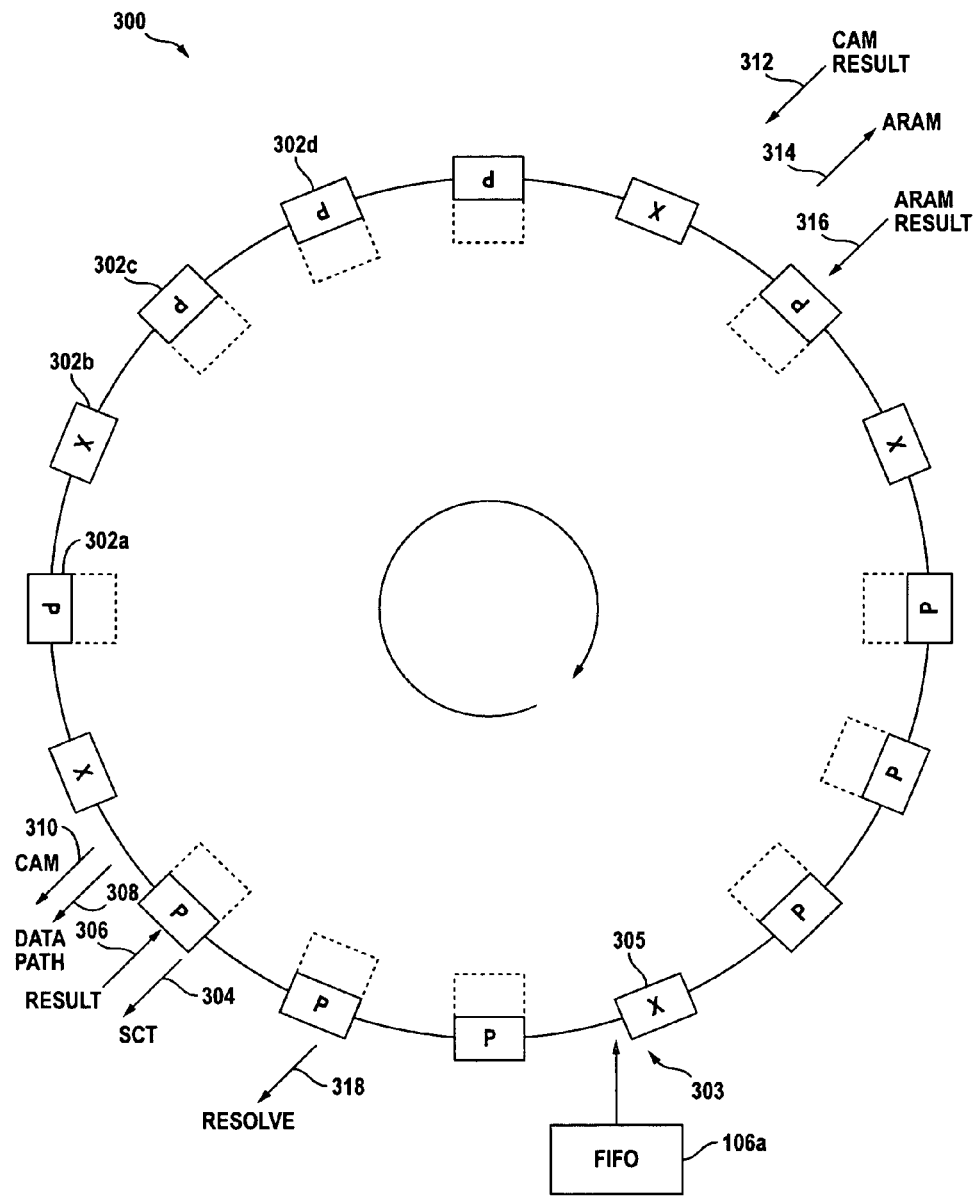
FIG. 3 is a diagram illustrating a conceptualization of the pipeline in the architecture of FIG. 1 as a rotating wheel.

Conceptually, the aforementioned pipeline can be represented by the clockwise rotating "ferris" wheel 300 illustrated in FIG. 3. The slots in the pipeline are represented by the carts 302a, 302b, 302c, 302d on the wheel. During a first loading phase of operation, processor 102 fills empty ones of the slots, identified with "X," with packet pointers taken from FIFO 106b. The resulting filled slots are identified in FIG. 3 with "P." The state data, which is shown in phantom, is stored in the slots along with the corresponding packet pointers. If the FIFO 106b is empty at the moment when an empty slot is available to be loaded, the slot is bypassed. Once the slots are either filled or bypassed, a second processing phase of operation is performed. In this phase of operation, processor 102 performs processing cycles on the packets whose pointers are in the slots. In this phase, as discussed, a default fixed number, for example, five, of processing cycles are performed for each packet unless the EXT bit 214 is turned "on" during one of these cycles. In this case, an extended number of cycles, i.e., beyond the default fixed number, are performed for the packet.

Some of the key events of the processing cycle are shown on the periphery of the wheel 300. At the point on the wheel identified with numeral 303, a packet pointer is taken from FIFO 106a and loaded into an empty slot on the wheel, i.e., the slot identified with numeral 305. At the point identified with numeral 304, an access is made to SCT 116 for the SCT entry that will control the processing cycle for the packet. As discussed, during the first cycle of processing of a slot, the address of this entry is obtained from CAM 112. However, during subsequent cycles of processing, the address of this entry is taken from the state data for the packet.

At the point identified with numeral 306, the SCT entry resulting from the access 304 is obtained. At the point identified with numeral 308, this SCT entry is processed by data path logic 120 to result in a CAM key. At the point identified with numeral 310, an access is made to CAM 126 using this key. Because of the latency of this CAM, the result of this access is not available until the point identified with numeral 312. At the point identified with numeral 314, assuming there is a CAM hit, the index portion of the matching CAM entry is used to access a corresponding entry in ARAM 130. At the point identified with numeral 316, the result of this access is available. At the point identified with numeral 318, conflicting updates to the state data for the packet between the SCT entry, the ARAM entry, and the current state data, are resolved.

The foregoing embodiment overcomes the problem identified at the outset with the conventional approach, whereby extended processing is either avoided for those packets requiring it, or else handled by increasing the fixed number of cycles for all packets. In contrast to this, in the foregoing embodiment, the same default, fixed number of processing cycles is normally performed for each packet. However, for those packets requiring extended processing, the EXT bit 214 is turned "on," thus providing extended processing cycles for these packets alone. The same default, fixed number of processing cycles is performed for all the other packets.

Figure 4:
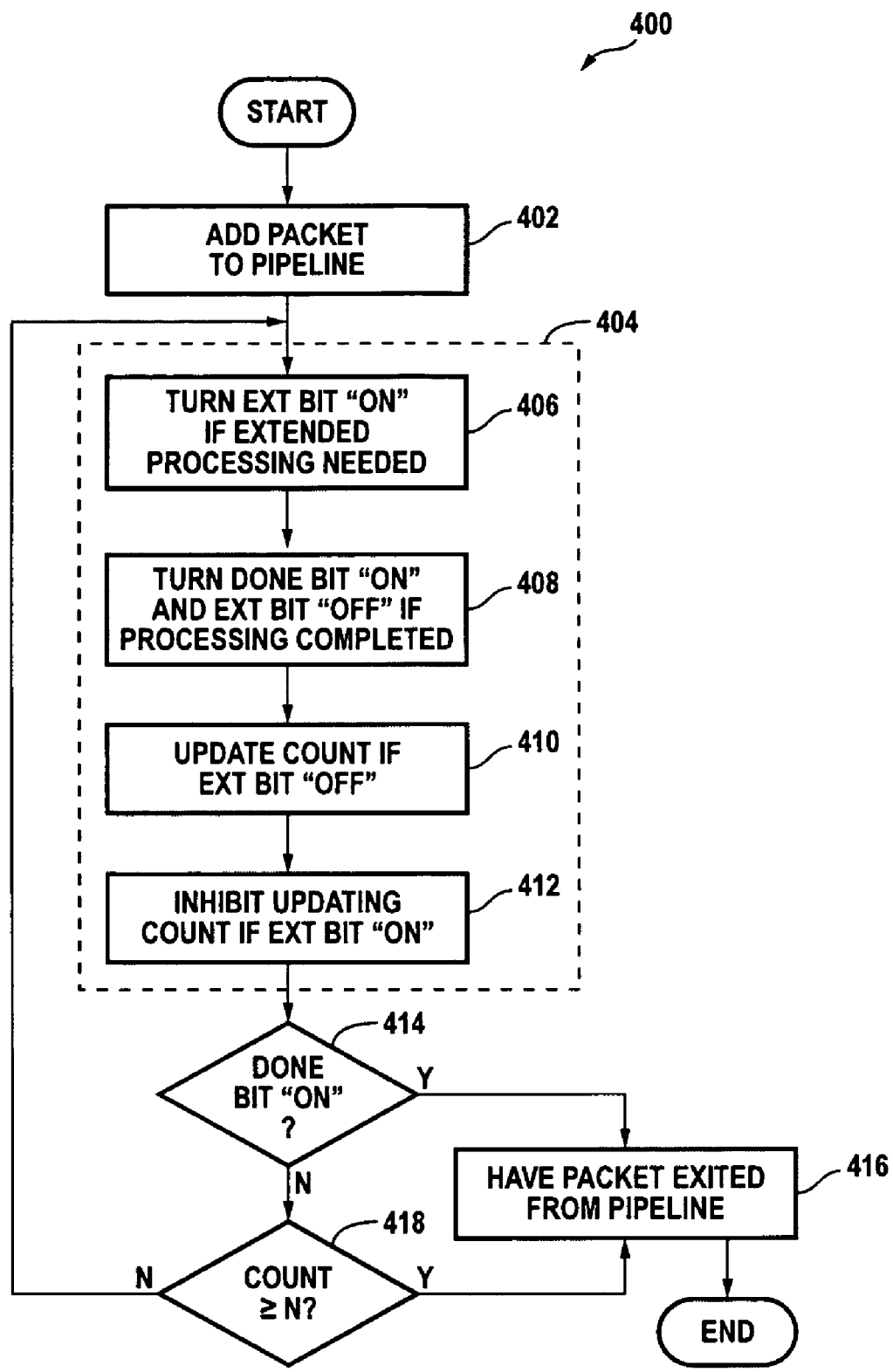
FIG. 4 is a flowchart of an embodiment of performing extended processing of selected packets in a pipelined packet processing system, characterized by the use of a done bit to terminate processing of a packet when processing is finished even if the number of processing cycles expended on the packet is less than the default, fixed number.

FIG. 4 summarizes the method steps in a second embodiment 400 in which the DONE bit 212 is also tested at the conclusion of the processing cycle. If turned "on," indicating that processing of the packet has finished, the packet is exited from the pipeline even if the default, fixed number of processing cycles have not been performed for the packet. The excess cycles resulting from this early exit from the pipeline can be allocated to other packets, for example, the packets requiring extended processing, thus helping offset some of the latency introduced through the extended processing of these packets.

In box 402, a packet is added to the pipeline. At this time, the DONE and EXT bits are turned "off." Moreover, the COUNT field for the packet is initialized, either to zero if the COUNT is to be incremented during subsequent processing, or to the default, fixed number of processing cycles, for example, five, if the COUNT is to be decremented during subsequent processing.

In box 404, a processing cycle is performed for the packet. In the course of performing this processing cycle, the substeps represented by boxes 406-412 are performed. In box 406, the EXT bit for the packet is turned "on" if the packet processing reveals that extended processing of the packet is needed. In box 408, the DONE bit is turned "on" (and the EXT bit turned "off") if packet processing reveals that processing of the packet has finished (determined independently of whether the default, fixed number of processing cycles have been performed for the packet).

In box 410, the COUNT for the packet is updated if the EXT bit for the packet is turned "off." If the COUNT is to represent the number of cycles that have been completed so far, it is incremented. If the COUNT is to represent the number of cycles that remain, it is decremented. In box 412, which can either be combined with or is inherent to box 412, the updating of the COUNT is inhibited if the EXT bit is "on."

In diamond 414, the DONE bit is tested. If "on," then the step represented by box 416 is performed. In that step, the packet is exited from the pipeline. If "off," then the test indicated in diamond 418 is performed. In that test, the COUNT for the packet is examined.

Assuming the COUNT indicates the number of processing cycles that have been performed so far, the COUNT is compared with N, the default, fixed number of processing cycles. If COUNT equals or exceeds N, then the step represented by box 416 is performed. In that step, the packet is exited from the pipeline. Otherwise, the method jumps back to box 404, and another processing cycle for the packet is performed in due course.

Assuming the COUNT indicates the number of processing cycles that remain, in diamond 418, the COUNT is compared with zero. If the COUNT is less than or equal to zero, then the step represented by box 416, exiting the packet from the pipeline, is performed. If the COUNT is greater than zero, the method jumps back to box 404, and another processing cycle for the packet performed in due course.

Figure 5:
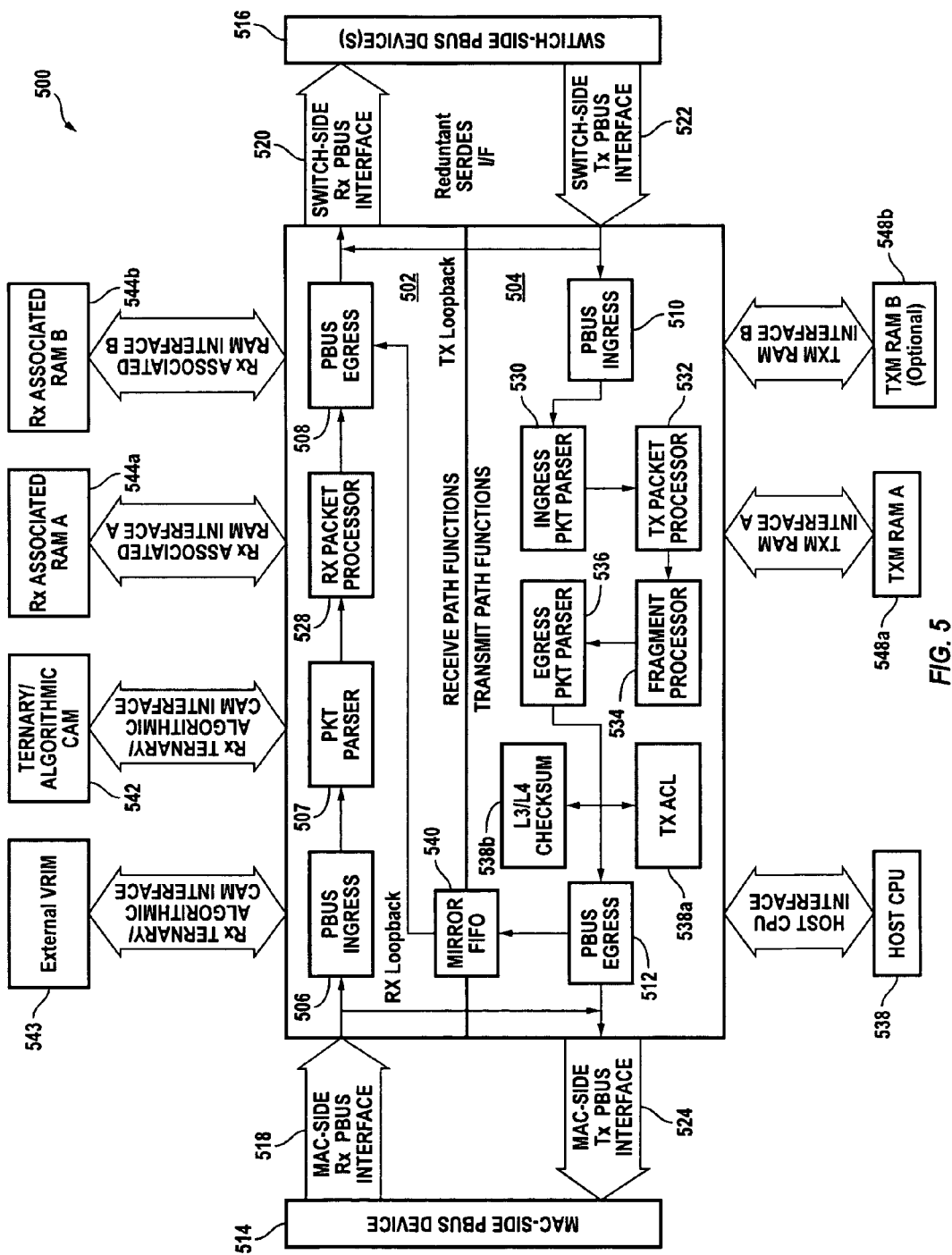
FIG. 5 illustrates a particular router architecture that embodies or utilizes the claimed method and system.

FIG. 5 illustrates an embodiment 500 of a particular router architecture in which the aforementioned system and method may operate. In this embodiment, as shown, the router is structured as a packet processing system comprising a packet classification/forwarding system 502 and a packet modification system 504. The packet classification/forwarding system 502 has an ingress portion 506 and an egress portion 508 through which ingress (network-side) packets may respectively enter and exit the packet classification/forwarding system 502. Similarly, the packet modification system 504 has an ingress portion 510 and an egress portion 512 through which egress (switch-side) packets may respectively enter and exit the packet modification system 504.

The ingress portion 506 of the packet classification/forwarding system 502 is coupled, through interface 518, to one or more network-side devices 514, and the egress portion 508 of the packet classification/forwarding system 502 is coupled, through interface 520, to one or more switch-side devices 516. Similarly, the ingress portion 510 of the packet modification system 504 is coupled, through interface 522, to the one or more switch-side devices 516, and the egress portion 512 of the packet modification system 504 is coupled, through interface 524, to the one or more network-side devices 514.

In addition to the ingress and egress portions 506, 508, the packet classification system 502 further comprises a first packet parser 507, and a packet processor 528.

Parser 507 is configured to parse an ingress packet and provide context pointers to the beginning of the packet layers, for example, pointers to the beginning of OSI layers 2, 3, and 4.

Packet processor 528 is configured to classify and forward the packet, responsive to the context pointer provided by parser 507.

Content Addressable Memory (CAM) 542 is used by the packet classification/forwarding system 502 to perform packet searches to arrive at a classification/forwarding decision for a packet. The CAM 542 may be ternary, binary, or a combination of binary and ternary.

The associated RAMs (ARAMs) 544a, 544b provide associated data for each entry in the CAM 542. The ARAMs 544a, 544b are accessed using the address (index value) returned by the CAM 542 as a result of a search operation. The ARAM 544a, 544b entry data is used to supply intermediate classification/forwarding information for the packet that is used by the packet processor 528 in making a final classification/forwarding decision for the packet.

Virtual Router Indirection Mapper (VRIM) 553 provides, through an indirection mapping process, certain identifiers, such as a virtual router identifier, needed to support virtual router functionality.

In addition to the ingress and egress portions 510, 512, the packet modification system 504 further comprises a second packet parser 530 for parsing an egress packet, modification processor 532, a fragment processor 536, a third packet parser 536, Access Control Logic ("ACL") 538a, and L3/L4 checksum logic 538b.

Parser 530 is configured to parse an egress packet and provide context pointers to the beginning of the packet layers, for example, pointers to the beginning of OSI layers 2, 3, and 4.

Modification processor 532 modifies some or all of an egress packet responsive to the context pointers provided by parser 530, in the process disassembling the packet into fragments. Fragment processor 536 re-assembles the fragmented packet.

The modification RAMs ("MRAMs") 548a, 548b provides data and control structures for packet modification operations performed by the modification processors 532a, 532b.

Parser 536 is configured to parse the reassembled packet and provide context pointers to the beginning of the packet layers, for example, pointers to the beginning of OSI layers 2, 3, and 4.

ACL logic 538b arrives at an ACL decision with respect to a packet, such as CPU copy, mirror copy; and kill, responsive to the parsed packet layers provided by parser 536. The CPU copy action forwards a copy of the packet to a host 538 coupled to the system. The mirror copy action implements an egress mirroring function, in which a copy of the packet is forwarded to mirror FIFO 540 and then on to the egress portion 408 of the packet classification/forwarding system 502. The kill action either kills the packet or marks it for killing by a downstream Media Access Control (MAC) processor.

L3/L4 checksum logic 538b is configured to compute a checksum for a modified packet. In one embodiment, logic 538b is configured to independently calculate a layer three (IP) and layer four (TCP/UDP) checksum.

In one implementation, the interfaces 518, 520, 522, 524, and one or more of the CAM, VRIM, ARAM, or MRAM interfaces (not identified, may be a QDR- or DDR-type interface as described in U.S. patent application Ser. No. 10/655,742, filed Sep. 4, 2003, which is hereby fully incorporated by reference herein as though set forth in full.

In one embodiment, the system of FIG. 1 is incorporated into the router of FIG. 5 within the forwarding and classification system 502. The correspondence between the elements of FIG. 1 and those of FIG. 4 in this particular embodiment is as follows: processor 102 in FIG. 1 corresponds with processor 528 in FIG. 5; RAM 110 corresponds with a portion of parser 507 in FIG. 5; CAM 126 in FIG. 1 corresponds with CAM 542 in FIG. 5; and ARAM 130 in FIG. 1 corresponds with ARAMs 544a, 544b in FIG. 5. FIFOs 104, 106, CAM 112, SCT 116, and Data Path Logic 120, are not represented in FIG. 5.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. In a packet processing system, a method comprising:
   implementing a processing pipeline having a fixed number of processing cycles, the fixed number of processing cycles to be applied to each packet through the pipeline as a default fixed number of processing cycles;
   maintaining a count of a number of processing cycles performed or remaining for each packet relative to the default fixed number of processing cycles, wherein the count of the number of processing cycles performed or remaining for each packet is maintained within a FIFO (First In First Out) buffer of the packet processing system as state data within a pointer to the corresponding packet maintained in a separate and distinct FIFO buffer having the corresponding packet buffered therein;
   prior to completion of the default fixed number of processing cycles for each packet:
      determining whether processing is complete for the packet or whether extended processing is required for the packet,
      setting a DONE bit for the packet when processing is complete for the packet prior to completion of the default fixed number of processing cycles, and
      setting an extension bit when extended processing is required for the packet in excess of the default fixed number of processing cycles for the packet;
   exiting each packet from the processing pipeline having its respective DONE bit is set;
   allocating excess cycles in the processing pipeline for each packet exited from the processing pipeline due to having its respective DONE bit set, to one or more packets having their respective extension bit set indicating extended processing is required for the one or more packets, wherein a quantity of excess cycles allocated corresponds to the difference between the count of the number of processing cycles performed or remaining for each packet exited from the processing pipeline due to having its respective DONE bit relative to the default fixed number of processing cycles; and
   applying the excess cycles in the processing pipeline to the extended processing required for each packet having its respective extension bit set, wherein the excess cycles are applied to each packet having its respective extension bit set through a subsequent cycle of the same processing pipeline.

2. The method of claim 1 wherein the default state of the extension bit is off and wherein the default state of the DONE bit is "off."

3. The method of claim 1, further comprising incrementing the count if the extension bit is set to the "off" state, and having each packet exited from the processing pipeline once the count equals or exceeds the default fixed number of processing cycles.

4. The method of claim 1, further comprising updating the count of the number of processing cycles performed or remaining for each packet by decrementing the count, when the count indicates a number of processing cycles remaining for each packet, and having the packet exited from the pipeline once the count is less than or equal to zero and the extension bit is off.

5. The method of claim 1, further comprising:
   having each packet exited from the pipeline once the done bit is set to the "on" state, even if the count of the number of processing cycles performed or remaining indicates the number of processing cycles the packet has undergone is less than the default fixed number of processing cycles for the processing pipeline.

6. The method of claim 5 wherein the default "off" state of the done bit is a logical "0" and the "on" state of that bit is a logical "1."

7. The method of claim 5 wherein the default "off" state of the done bit is a logical "1" and the "on" state of that bit is a logical "0."

8. The method of claim 1 wherein the packet processing system is in a router, switch, or combination router/switch.

9. The method of claim 8 wherein the packet processing system is for making a classification and forwarding decision for a packet.

10. The method of claim 8 wherein the packet processing system is implemented through ASIC technology on one or more integrated circuit chips.

11. A packet processing system comprising:
    a processor;
    a plurality of commands, instructions, and/or state transitions;
    wherein the processor of the packet processing system to execute the plurality of commands, instructions, and/or state transitions causing the packet processing system to perform a method comprising:
    implementing a processing pipeline having a fixed number of processing cycles, the fixed number of processing cycles to be applied to each packet through the pipeline as a default fixed number of processing cycles;
    maintaining a count of a number of processing cycles performed or remaining for each packet relative to the default fixed number of processing cycles, wherein the count of the number of processing cycles performed or remaining for each packet is maintained within a FIFO (First In First Out) buffer of the packet processing system as state data within a pointer to the corresponding packet maintained in a separate and distinct FIFO buffer having the corresponding packet buffered therein;
    prior to completion of the default fixed number of processing cycles for each packet:
    determining whether processing is complete for the packet or whether extended processing is required for the packet,
    setting a DONE bit for the packet when processing is complete for the packet prior to completion of the default fixed number of processing cycles, and
    setting an extension bit when extended processing is required for the packet in excess of the default fixed number of processing cycles for the packet;
    exiting each packet from the processing pipeline having its respective DONE bit is set;
    allocating excess cycles in the processing pipeline for each packet exited from the processing pipeline due to having its respective DONE bit set, to one or more packets having their respective extension bit set indicating extended processing is required for the one or more packets; and applying the excess cycles in the processing pipeline to the extended processing required for each packet having its respective extension bit set, wherein the excess cycles are applied to each packet having its respective extension bit set through a subsequent cycle of the same processing pipeline.

12. The packet processing system of claim 11, wherein the method performed further comprises:

updating the count of the number of processing cycles performed or remaining for each packet by decrementing the count, when the count indicates a number of processing cycles remaining for each packet; and exiting the packet from the pipeline once the count is less than or equal to zero and the extension bit is off.

13. The packet processing system of claim 11, wherein the method performed further comprises:

exiting each packet from the pipeline once the done bit is set to the "on" state, even if the count of the number of processing cycles performed or remaining indicates the number of processing cycles the packet has undergone is less than the default fixed number of processing cycles for the processing pipeline.

14. A packet processing system comprising:

a packet processor to implement a processing pipeline having a fixed number of processing cycles, the fixed number of processing cycles to be applied to each packet through the pipeline as a default fixed number of processing cycles wherein the packet processor is to:

maintain a count of a number of processing cycles performed or remaining for each packet relative to the default fixed number of processing cycles, wherein the count of the number of processing cycles performed or remaining for each packet is maintained within a FIFO (First In First Out) buffer of the packet processing system as state data within a pointer to the corresponding packet maintained in a separate and distinct FIFO buffer having the corresponding packet buffered therein;

determine, prior to completion of the default fixed number of processing cycles for each packet:

whether processing is complete for the packet or whether extended processing is required for the packet, set a DONE bit for the packet when processing is complete for the packet prior to completion of the default fixed number of processing cycles, and set an extension bit when extended processing is required for the packet in excess of the default fixed number of processing cycles for the packet;

wherein the packet processor is to further:

exit each packet from the processing pipeline having its respective DONE bit is set;

allocate excess cycles in the processing pipeline for each packet exited from the processing pipeline due to having its respective DONE bit set, to one or more packets having their respective extension bit set indicating extended processing is required for the one or more packets; and apply the excess cycles in the processing pipeline to the extended processing required for each packet having its respective extension bit set, wherein the excess cycles are applied to each packet having its respective extension bit set through a subsequent cycle of the same processing pipeline.

15. The packet processing system of claim 14, wherein the packet processor is to further increment the count if the extension bit is set to the "off" state, and having each packet exited from the processing pipeline once the count equals or exceeds the default fixed number of processing cycles.

16. The packet processing system of claim 14, wherein the packet processor is to further:

update the count of the number of processing cycles performed or remaining for each packet by decrementing the count, when the count indicates a number of processing cycles remaining for each packet, and exit the packet from the pipeline once the count is less than or equal to zero and the extension bit is off.

17. The packet processing system of claim 14, wherein the packet processor is to further:

exit each packet from the pipeline once the done bit is set to the "on" state, even if the count of the number of processing cycles performed or remaining indicates the number of processing cycles the packet has undergone is less than the default fixed number of processing cycles for the processing pipeline.

* * * * *